United States Patent Office 2,789,917
Patented Apr. 23, 1957

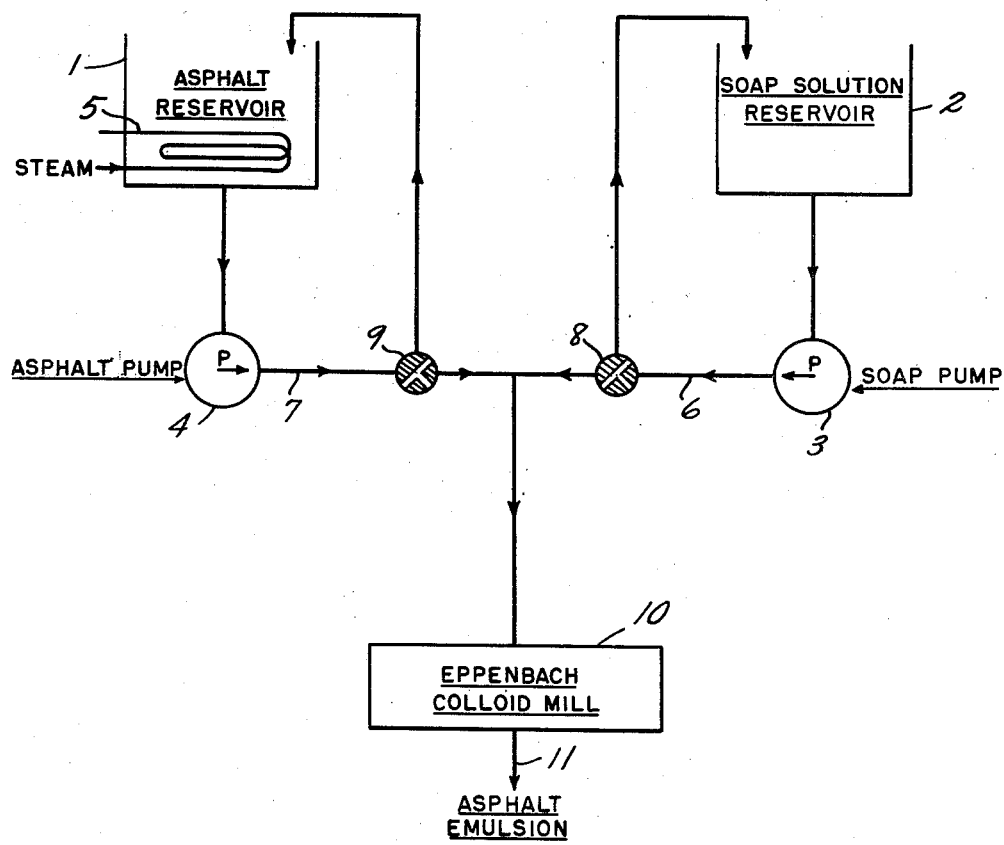

2,789,917
METHOD OF PREPARING AN ASPHALT EMULSION

Harley F. Hardman, Lyndhurst, and Robert F. Jenkins, Cleveland, Ohio, assignors to The Standard Oil Company, Cleveland, Ohio, a corporation of Ohio Application August 17, 1953, Serial No. 374,608

1 Claim. (Cl. 106—277)

This invention relates to a method of preparing an asphalt emulsion having aluminum sulfate incorporated in the asphalt base thereof.

Ordinary asphalt from petroleum sources that is used for paving purposes, usually termed asphalt "cement," must be heated to a temperature of about 250 to 350° F. in order to be free flowing for mixture with aggregate. Generally the aggregate must also be heated. In order to avoid the requirements for heating, it has been proposed to flux or dissolve the asphalt in a hydrocarbon solvent in order that the asphalt may be free flowing at room or ambient temperatures. The amount of the solvent determines the viscosity of the asphalt. These compositions are known as "cut-back" asphalts. This form of asphalt finds certain uses but is more expensive because of the solvent requirements. The evaporation of the solvent after use also presents fire hazards and may be time consuming.

A third general type of asphalt product is obtained by emulsifying asphalt in water. Asphalt "emulsions" have been used more extensively abroad than in this country. The asphalt is more commonly emulsified as the inner phase of the emulsion which is of the so-called oil-in-water type. The particles of asphalt in the emulsion range from 1 to 20 microns in size and the asphalt emulsion is free flowing at ordinary temperatures. The water and emulsifying agent used in making an emulsion is, of course, much cheaper than the hydrocarbon solvent required for making a cut-back asphalt. The viscosities of the asphalt emulsions and the cut-back asphalts may be made comparable. Asphalt emulsions are generally made in three types: The RS or rapid setting type, the MS or medium setting type, and the SS or slow setting type. The first two are the most common and the RS type is subdivided into RS-1 and RS-2 types differing in viscosity.

In the process of making asphalt emulsions, the asphalt is heated to a liquid state, and the water containing the dispersing agent, generally soap, is emulsified with the heated asphalt, such as in a colloid mill. The emulsion varies in color from brown to black, the lighter colors generally indicating a greater subdivision of the asphalt particles.

When the asphalt emulsion is applied to aggregate or soil, the water either evaporates or is absorbed and the emulsion breaks. The asphalt residue is intended to adhere to the aggregate or soil.

Asphalt emulsion must meet five important criteria, i. e., stability, demulsibility, asphalt content, viscosity and adhesion.

The emulsion must not separate before use and this properly is referred to as "stability." This is important since the emulsion is usually prepared ahead of time and shipped in drums, tank or railroad cars and must remain unbroken in the emulsion form until used. If the emulsion breaks in the container, not only would the product be useless, but it would be difficult to remove the asphalt from the container. Practically speaking, the emulsion must remain stable during any storage time at the refinery, during shipping, and during any storage time after receipt until used. This period may vary widely from a week to many months depending on individual requirements. There are many instances where an asphalt emulsion is made, shipped and used in a few days. Federal specifications SS–A–674a require no separation of asphalt at the time of use provided the material is not held more than thirty days after delivery. There is no acceptable rating for asphalt emulsion stability.

The demulsibility indicates the rate at which the emulsion breaks into its components after it is applied. This is an important use property and to some extent is opposed to stability. It is possible to achieve adequate stability by increasing the emulsifier content, but demulsibility is adversely affected. The specifications for demulsibility are definite, and it is essential to meet them while at the same time achieving as much stability as possible. Generally ionic and polar materials increase demulsibility and give poor stability, as is seen by the fact that calcium chloride is used in the following test.

The demulsibility test is described as A. S. T. M. Test No. D–244–42 and is carried out by adding calcium chloride solution to the emulsion and measuring the amount of asphalt that is recovered from the emulsion within certain times. Ohio Specification M–5.5 requires at least 60% of the asphalt to be demulsified within the time specified in the A. S. T. M. test in the RS types, and not more than 30% in the MS type. Thus the emulsion must be one which is unstable under the conditions of use but must be stable until use.

The asphalt content is generally specified as 50% or more. Ohio Specification M–5.5 requires an asphalt content of at least 55% and 60% for the rapid setting types and at least 60% for the medium setting type. This requirement is important since it is the asphalt content of the emulsion that is of value and asphalts of high water content are less desirable because the water is of no value.

Viscosity requirements generally are such as to permit mixing of the emulsion with the aggregate. The viscosity is related somewhat to asphalt content. If the water content of the emulsion is plotted against viscosity, there is a sharp decrease in viscosity of the emulsion when the water content reaches 40 to 50%, and as the amount of water increases beyond this, the viscosity of the emulsion rapidly approaches the viscosity of water. Asphalt contents above about 50 to 60% have higher viscosities. Thus an emulsion with maximum asphalt content, which has a low enough viscosity for mixing, is ideal. The viscosity is measured in Furol seconds at a stated temperature. The viscosity measurement test is described as A. S. T. M. D–244–42. Ohio Specification M–5.5 specifies a viscosity of 20 to 100 for the RS-1 type at 25° C., 75 to 400 for the RS-2 type at 50° C., and 100 to 1,000 for the MS type at 50° C.

The last requirement, namely adhesion, is particularly important and is more significant in the case of emulsions than in the case of asphalt cements. Since asphalt cements are generally applied hot to dry aggregate, it is not as difficult to secure initial adhesion when the asphalt is mixed with aggregate. In the case of asphalt emulsions, however, the water is in the outer phase and tends to wet the aggregate before the asphalt touches it. In fact, one of the advantages attributed to asphalt emulsion is the ability to use a wet aggregate during construction, thereby eliminating the expense of drying and preheating the aggregate.

Asphalt emulsions are notoriously poor in adhesion properties. When this can be improved, such as with a larger amount of emulsifier or wetting agent, demulsibility is adversely affected. There is no standardized A. S. T. M. or Federal testing procedure for this property of emulsions. Various adhesion tests have been proposed and one test which has been devised, and which is the one used by the applicants, is Ohio Specification M–205.5. The testing procedure is as follows:

100 grams of dry standard silica aggregate graded to pass a ¼ inch sieve and to be retained on a No. 10 sieve shall be heated to 300° F. in a metal container on a hotplate, then 8 grams of the emulsion added (the emulsion need not be heated) and mixed until the aggregate is completely coated. Approximately 50 grams of the mixture shall be spread thinly on a metal can lid or a watch glass and placed in a constant temperature oven at 200° F. for 24 hours. At the end of this curing period, the 50-gram sample shall be thoroughly remixed if any drainage has occurred and dropped into 400 cc. of boiling distilled water in a 600 cc. beaker and stirred for 3 minutes at the rate of approximately 60 times per minute, continuing the boiling of the water during the 3-minute period. The beaker shall then be removed from the source of the heat and after ebullition ceases, cold water shall be run into the beaker through a ¼ inch tubing submerged about one inch below the surface of the water. The addition of the cold water shall be continued until the film of asphalt on the surface of the water in the beaker has flown over the side. After this is accomplished, the sample shall be removed from the beaker, care being taken to prevent re-coating of the aggregate with asphalt deposited on the beaker, and placed on absorbent paper. After drying, the sample shall be examined for uncoated areas and an estimate made of the percent of aggregate area remaining coated with asphalt.

Most commercial asphalt emulsions have a rating of 0 to 15% when tested by the above procedure. An additive that raises the adhesion of the asphalt emulsion to 50% under this test is considered to impart a marked improvement, and an adhesion of 75% or above is excellent.

A résumé of the requirements is as follows:

| Requirement | RS-1 | RS-2 | MS |
| --- | --- | --- | --- |
| Stability | Satisfactory. | Satisfactory. | Satisfactory. |
| Demulsibility: | | | |
| 35 cc. N/50 CaCl₂, percent | 60+ | 60+ | |
| 50 cc. N/10 CaCl₂, percent | | | 30–. |
| Asphalt content or residue, percent. | 55+ | 60+ | 60+. |
| Furol viscosity in seconds: | | | |
| at 25° C | 20–100 | | |
| at 50° C | | 75–400 | 100–1,000. |
| Adhesion test, percent of aggregate coated. | 50 to 75 or more. | 50 to 75 or more. | 50 to 75 or more. |

It is difficult to meet all of these specifications. Asphalt content and viscosity are the most readily met, but an emulsion that has satisfactory stability and demulsibility, and also meets the requirements for good adhesion is difficult to make. The invention is concerned with achieving a balance between stability and demulsibility and at the same time improving the adhesion of the asphalt to aggregate. The difficulty of achieving good adhesion along with stability and demulsibility will be readily understood when it is considered that the stability and demulsibility largely involve surface active considerations. The same is true of the adhesion of the asphalt, i. e., the ability of the asphalt to adhere to the aggregate is largely a surface active phenomenon. Many compounds are available to improve the adhesion of asphalt cement which cannot be used in asphalt emulsions because these compounds are generally so polar or possess such surface active properties as to interfere with the stability or demulsibility of the emulsion. The selection of an additive which will increase the adhesion and not affect the stability or demulsibility, i. e., will still permit the emulsion to meet specifications on these scores, is a genuine problem in the art not easily solved.

Asphalt emulsions are fully described in the art. The invention is applicable to all asphalt emulsions, especially those of the oil-in-water type in which the dispersing agent is or comprises a soap. The manner of making the emulsions is well known in the art together with the ingredients, proportions, mixing techniques and conditions, and further description is not necessary.

In an asphalt emulsion made with a sodium soap as the emulsifier, it is believed that a fatty end of the soap molecule attaches itself to the asphalt in the emulsion and the sodium end of the soap molecule projects and is in the aqueous phase. It will be apparent that any ingredient of either the asphalt or the aqueous phases may readily affect this balance to such an extent as to affect the character of the emulsion.

Additives useful in cement and cut-back do not serve as guides in solving the problem of improving the adhesion of emulsions because most adhesive additives for asphalt cement are unsuitable in emulsions and there is no correlation or predictability from the asphalt cement art as to what additives are suitable in emulsions.

In accordance with the present invention, stabilized asphalt emulsions are prepared by incorporating aluminum sulfate in finely divided form in the asphalt base before it is emulsified. A sufficient quantity of a strong base is included in the aqueous phase in addition to the emulsifier to neutralize any acidic products of the hydrolysis of the aluminum sulfate and to maintain the aqueous phase of the emulsion basic.

The inclusion of aluminum sulfate as above described gives an emulsion having improved adhesion and at the same time meets stability, demulsibility and other requirements. This is surprising because the inclusion of electrolytes markedly affects the properties of emulsions, but it may be explained because the aluminum sulfate in accordance with the invention is in the asphalt phase rather than in the aqueous phase, and in this connection the invention is to be distinguished from many prior proposals of adding various ingredients to the aqueous phases of asphalt emulsions. There is no improvement when aluminum sulfate is added to the aqueous phase. Apparently, the aluminum sulfate on the surface of the asphalt spheres in the emulsion, probably in coaction with the base in the aqueous phase, modifies the surface properties of the asphalt.

Since an alkaline reaction is desirable, basic aluminum sulfate, $Al(OH)SO_4$, can be used in the process of the invention as well as $Al_2(SO_4)_3$. The basic aluminum sulfate occurs to a varying degree in commercial aluminum sulfates. It is relatively insoluble in water, whereas $Al_2(SO_4)_3$ is soluble, and the solubility of a sample may be taken as an indication of the basic salt content. Any of the various hydrates of $Al_2(SO_4)_3$ may be employed in the process of the invention and the term "aluminum sulfate" is intended to include anhydrous aluminum sulfate, all of the hydrates thereof, and any basic aluminum sulfate present.

The aluminum sulfate may be incorporated in the asphalt in any manner so that it is intimately admixed. It may be added as a fine powder and mixed, or added as a solution or slurry in any solvent, such as water, and if desired the solvent removed, such as described in application Serial No. 374,628, filed August 17, 1953.

Referring to the accompanying drawings, a flow sheet is shown of the process employed in the preparation of the emulsions. Asphalt base is heated in an open-top container to a temperature of about 260° F. This temperature is not critical and it is necessary only to heat the asphalt base to a temperature such that it will flow freely. Aluminum sulfate, in finely divided form, is added to the heated asphalt base and thoroughly dispersed therein by means of a turbine-type or other similar mixer. The asphalt base containing the aluminum sulfate additive is then transferred to the asphalt reservoir 1. A basic soap solution is prepared in the soap solution reservoir 2. The soap and asphalt pumps 3 and 4, connected to the soap reservoir 2 and asphalt reservoir 1, respectively, are then started and the materials are recycled into their respective reservoirs while steam is passed through a coil 5 in the asphalt reservoir until the asphalt reaches a temperature of 275° F.

The discharge line 6 from the soap pump 3 and the discharge line 7 from the asphalt pump 4 are provided with 3-way valves 8 and 9, respectively. By turning 3-way valve 8, soap solution is pumped into a colloid mill 10 at room temperature. As soon as the soap solution emerges from the product line 11, asphalt is also pumped into the colloid mill 10 by turning 3-way valve 9.

After diverting about a pint of emulsion to waste, a sample of about ¾ gallon of emulsion is collected. The samples are discharged from the colloid mill at a temperature of about 175 to 185° F. and are allowed to cool slowly to room temperature before testing.

The emulsifier used in preparing the emulsion may be any of whose which are well known to the art for this purpose. Soaps, i. e., alkali metal salts of oleaginous soap forming materials, such as fatty acids, resin acids and glycerides thereof, are commonly used. Examples are sodium tallate (which is the sodium soap of tall oil); the potassium soap of wood rosin; vegetable or animal oils and fats saponified with alkali; tar oils and resins saponified with alkali; wood tar, wood tar pitch or rosin pitch saponified with alkali; soaps combined with solvents; sulfonated products such as sulfonated derivatives of fatty acids, resins, hydrocarbons and alcohols; sulfonated mineral oil derivatives; and the like.

Emulsions may be prepared in accordance with the invention by adding all of the soap employed, such as sodium tallate, and the excess alkali to the aqueous phase and then mixing the soap with the asphalt base containing the aluminum sulfate dispersed therein, or alternatively, a portion of the oleaginous material from which the soap is made may be mixed with the asphalt base together with the aluminum sulfate. When the asphalt base and the aqueous soap solution are then mixed, it is believed that the excess base of the aqueous phase reacts with the oleaginous material of the asphalt phase to form soap at the interface between the asphalt and water. By forming the emulsions in the latter manner, the overall oleaginous material requirements are less than when no oleaginous material is added to the asphalt phase. For example, if sodium tallate is the emulsifier, some tall oil may be added to the asphalt phase and it is believed that there is a concentration of sodium tallate at the asphalt-water interface due to the action of the base on the tall oil since it can exert no antistripping effect anywhere else.

Satisfactory emulsions prepared by the process of the invention contain 50 to 75% by weight asphalt; 0.05 to 2%, preferably about 0.1 to about 0.5% by weight aluminum sulfate based on the asphalt phase; 0.5 to 5% by weight emulsifying agent based on the aqueous phase; 0.01 to 1% by weight of a strong base, preferably about 0.1 to 0.5% by weight of sodium or potassium hydroxide based on the aqueous phase; and the remainder water. Other strong bases than sodium or potassium hydroxide may be employed including amines, alkylolamines, barium hydroxide, lithium hydroxide, calcium hydroxide, strontium hydroxide, and the like. The amount and alkalinity of the base should be sufficient to maintain the pH of the aqueous phase above 7, preferably 10 to 12.5. When no oleaginous material such as tall oil is added to the asphalt phase, it may constitute 0.05 to 2%, preferably 0.1 to 1% of the emulsion. The amount of emulsifier employed is not critical.

The invention will be further illustrated by reference to the following specific examples:

EXAMPLE 1

A series of emulsions were prepared which were designed to meet the specifications for a rapid-setting emulsion as set forth in the table above. The emulsions were prepared in the manner described above and the data on the various emulsions are given below:

*Table I*

EFFECTIVENESS OF DIFFERENT SUBSTANCES IN RAPID-SETTING-TYPE EMULSIONS

[192-208 pen. PSB asphlat base]

| Sample | Additive | Conc. of Additive, Percent By Wt. On Asphalt Base | Percent Soap By Wt. On Aqueous Phase | Percent Added Base By Wt. On Aqueous Phase | Percent Asphalt | Percent Demuls. | Vis. SF at 77° F. | Percent Coated | Stability in Container |
|---|---|---|---|---|---|---|---|---|---|
| 1 | None | 0.0 | 1.60 | 0.14 | 72.8 | 69 | 150 | 5 | Good. |
| 2 | Commercial Amine Compound | 1.0 | | | 60.3 | 18.5 | (1) | 25 | (1) |
| 3 | Octadecylamine | 0.7 | 1.18 | 0.046 | 54.8 | 100 | (1) | (2) | Broke after 2 hours. |
| 4 | Al stearate | 1.0 | 1.21 | 0.040 | 53.7 | (1) | (1) | 20 | (1) |
| 5 | Al₂(SO₄)₃ (Source No. 1) | 0.51 | 1.47 | 0.13 | 62.3 | 74 | 44 | 94 | Fair. |
| 6 | Al₂(SO₄)₃.14H₂O (Source No. 2) | 0.61 | 1.44 | 0.16 | 58.8 | 62 | 53 | 96 | Fair. |
| 7 | Al₂(SO₄)₃ (Source No. 2) | 0.51 | 1.76 | 0.30 | 63.2 | 70 | 172 | 97 | Good. |
| 8 | Al₂(SO₄)₃ (Source No. 3) | 0.41 | 1.76 | 0.32 | 62.9 | 70 | 235 | 95 | Good. |

[1] No observation recorded.
[2] Coating test could not be obtained.

The amine used as the additive in Sample 2 is a commercial substance sold as an antistripping additive for asphalt cement. Octadecylamine, used in Sample 3, is also proposed as an antistripping agent in asphalt cement, but the data for Sample 3 show that it is not effective for use in emulsions since the emulsion broke and a coating test could not be obtained. Sample 4 shows that not all aluminum salts are operative. When aluminum sulfate is used all specifications are met. Samples 7 and 8 show that stability is improved when the amount of excess base is at least 0.2%.

The data for the various tests also show that the amount of water of hydration in the aluminum sulfate has no effect on the properties of the emulsions produced.

The emulsifier used in the above tests was sodium tallate. The added base was sodium hydroxide.

EXAMPLE 2

A series of tests similar to Example 1 were run to show the effect of aluminum sulfate on a medium setting asphalt emulsion. The results are shown in Table II.

Table II
EFFECT OF ALUMINUM SULFATE IN MEDIUM-SETTING EMULSIONS

| Sample | Additive | Conc. of Additive, Percent By Wt. On Asphalt Base | Percent Soap By Wt. On Aqueous Phase | Percent Added Base By Wt. On Aqueous Phase | Percent Asphalt | Percent Demuls. | Vis. SF at 77° F. | Percent Coated | Stability in Container |
|---|---|---|---|---|---|---|---|---|---|
| 1 | None | 0 | 3.74 | 0.18 | 71.4 | 0.3 | 200 | 5 | Good. |
| 2 | Aluminum sulfate (Source No. 1) | 0.6 | 3.06 | 0.24 | 64.1 | 0.3 | 298 | 98 | Good. |
| 3 | Aluminum sulfate (Source No. 1) | 0.6 | 2.46 | 0.30 | 63.6 | 0.3 | 329 | 97 | Good. |
| 4 | Aluminum sulfate (Source No. 2) | 0.6 | 3.22 | 0.36 | 63.5 | 0.3 | ¹ 92 | 100 | Good. |

¹ A slightly higher asphalt content would have met viscosity specifications without materially affecting other properties.

In the above tests the emulsifier was the potassium soap of wood rosin and the base was sodium hydroxide.

EXAMPLE 3

A sample was prepared using sodium tallate as the emulsifier and including tall oil in the asphalt. The composition and results are as follows:

| | |
|---|---|
| Percent soap | 0.96 |
| Percent added NaOH | 0.30 |
| Additive concentration: | |
| Percent Al sulfate | 0.33 |
| Percent tall oil | 0.50 |
| Percent asphalt | 62.0 |
| Percent demulsibility (35 cc. N/50 $CaCl_2$) | 62.0 |
| Percent coated | 95 |
| Vis. at S. F. at 77° F | 400 |
| Stability | Good |

This sample passed all tests for an RS emulsion. It will be noted that the amount of soap is less than that used in the samples in Tables I and II.

It will be obvious to those skilled in the art that many modifications may be made within the scope of the present invention without departing from the spirit thereof and the invention is to be restricted only in accordance with the appended claim.

We claim:

A method of producing an asphalt emulsion which comprises intimately mixing an oleaginous material in an amount of 0.05 to 2% by weight of the total emulsion reactive with an alkali metal base to form a soap and 0.05 to 2% by weight aluminum sulfate based on the weight of the asphalt with asphalt, and subsequently emulsifying the resulting asphalt mixture with an aqueous solution of a water soluble soap and an alkali metal base, said base being present in amounts sufficient to maintain the emulsion at a pH above 7.

References Cited in the file of this patent

UNITED STATES PATENTS

| | | |
|---|---|---|
| 1,957,031 | Myers | May 1, 1934 |
| 2,313,759 | McCoy | Mar. 16, 1943 |
| 2,330,100 | Williams | Sept. 21, 1943 |
| 2,376,447 | Mullin | May 22, 1945 |
| 2,412,545 | Watts | Dec. 10, 1946 |
| 2,431,891 | Rosencranse | Dec. 2, 1947 |
| 2,615,851 | Manzer | Oct. 28, 1952 |
| 2,670,304 | McCoy | Feb. 23, 1954 |

FOREIGN PATENTS

| | | |
|---|---|---|
| 547,242 | Great Britain | Aug. 19, 1942 |
| 321,948 | Great Britain | Nov. 22, 1929 |